(12) United States Patent
Murren et al.

(10) Patent No.: US 7,519,546 B2
(45) Date of Patent: Apr. 14, 2009

(54) MAINTAINING SYNCHRONIZATION OF INFORMATION PUBLISHED TO MULTIPLE SUBSCRIBERS

(75) Inventors: Brian T. Murren, Clifton Park, NY (US); Barry Hathaway, Saratoga Springs, NY (US)

(73) Assignee: General Electric Company, Schenectady, NY (US)

( * ) Notice: Subject to any disclaimer, the term of this patent is extended or adjusted under 35 U.S.C. 154(b) by 629 days.

(21) Appl. No.: 09/847,035

(22) Filed: Apr. 30, 2001

(65) Prior Publication Data

US 2003/0110085 A1 Jun. 12, 2003

(51) Int. Cl.
*G06F 17/60* (2006.01)

(52) U.S. Cl. ............................................. 705/26

(58) Field of Classification Search ............... 705/26, 705/27, 37
See application file for complete search history.

(56) References Cited

U.S. PATENT DOCUMENTS

| | | | |
|---|---|---|---|
| 5,265,221 A | 11/1993 | Miller | |
| 5,410,646 A | 4/1995 | Tondevold et al. | |
| 5,434,776 A | 7/1995 | Jain | |
| 5,590,197 A * | 12/1996 | Chen et al. | 705/65 |
| 5,678,039 A | 10/1997 | Hinks et al. | |
| 5,704,029 A | 12/1997 | Wright, Jr. | |
| 5,745,754 A * | 4/1998 | Lagarde et al. | 707/104.1 |
| 5,790,790 A * | 8/1998 | Smith et al. | 709/206 |
| 5,790,809 A | 8/1998 | Holmes | |
| 5,835,896 A * | 11/1998 | Fisher et al. | 705/37 |
| 5,870,605 A | 2/1999 | Bracho et al. | |
| 5,890,175 A * | 3/1999 | Wong et al. | 715/505 |
| 5,898,836 A * | 4/1999 | Freivald et al. | 709/218 |
| 5,915,209 A * | 6/1999 | Lawrence | 340/3.7 |
| 5,928,335 A | 7/1999 | Morita | |
| 5,970,231 A * | 10/1999 | Crandall | 709/238 |
| 5,977,971 A | 11/1999 | Guzak et al. | |
| 5,978,799 A * | 11/1999 | Hirsch | 707/4 |
| 5,999,948 A | 12/1999 | Nelson et al. | |
| 6,035,121 A | 3/2000 | Chiu et al. | |
| 6,047,377 A | 4/2000 | Gong | |
| 6,058,417 A * | 5/2000 | Hess et al. | 709/219 |
| 6,061,686 A * | 5/2000 | Gauvin et al. | 707/10 |
| 6,115,690 A * | 9/2000 | Wong | 705/7 |
| 6,128,655 A * | 10/2000 | Fields et al. | 709/219 |
| 6,144,944 A * | 11/2000 | Kurtzman et al. | 705/14 |
| 6,151,022 A | 11/2000 | Alshibani et al. | |
| 6,175,841 B1 | 1/2001 | Loiacono | |

(Continued)

FOREIGN PATENT DOCUMENTS

JP 358181396 A * 10/1983

OTHER PUBLICATIONS

White, Ron, How Computers Work, Millennium Ed. Que Corporation, Sep. 1999.*

(Continued)

*Primary Examiner*—Pierre E Elisca
(74) *Attorney, Agent, or Firm*—Lee & Hayes, PLLC

(57) ABSTRACT

Information describing one or more items is published to multiple subscribers. A subsequent change to the information requested by one of the multiple subscribers (such as a change in the status of an item corresponding to the information) is communicated to each of subscribers to which the information was previously published.

25 Claims, 7 Drawing Sheets

U.S. PATENT DOCUMENTS

| | | | |
|---|---|---|---|
| 6,192,407 B1* | 2/2001 | Smith et al. | 709/229 |
| 6,216,114 B1* | 4/2001 | Alaia et al. | 705/37 |
| 6,233,566 B1* | 5/2001 | Levine et al. | 705/37 |
| 6,243,721 B1 | 6/2001 | Duane et al. | |
| 6,252,589 B1 | 6/2001 | Rettig et al. | |
| 6,253,251 B1 | 6/2001 | Benantar et al. | |
| 6,275,957 B1* | 8/2001 | Novik et al. | 714/39 |
| 6,292,827 B1 | 9/2001 | Raz | |
| 6,308,212 B1 | 10/2001 | Besaw et al. | |
| 6,345,278 B1 | 2/2002 | Hitchcock et al. | |
| 6,366,891 B1* | 4/2002 | Feinberg | 705/37 |
| 6,385,724 B1 | 5/2002 | Beckman et al. | |
| 6,412,008 B1 | 6/2002 | Fields et al. | |
| 6,415,284 B1 | 7/2002 | D'Souza et al. | |
| 6,434,568 B1* | 8/2002 | Bowman-Amuah | 707/103 R |
| 6,438,594 B1* | 8/2002 | Bowman-Amuah | 709/225 |
| 6,460,036 B1* | 10/2002 | Herz | 707/10 |
| 6,473,748 B1 | 10/2002 | Archer | |
| 6,473,791 B1 | 10/2002 | Al-Ghosein et al. | |
| 6,477,665 B1* | 11/2002 | Bowman-Amuah | 714/39 |
| 6,487,599 B1* | 11/2002 | Smith et al. | 709/229 |
| 6,487,665 B1 | 11/2002 | Andrews et al. | |
| 6,513,038 B1 | 1/2003 | Hasegawa et al. | |
| 6,519,570 B1* | 2/2003 | Faber et al. | 705/8 |
| 6,519,571 B1* | 2/2003 | Guheen et al. | 705/14 |
| 6,529,950 B1 | 3/2003 | Lumelsky et al. | |
| 6,529,956 B1* | 3/2003 | Smith et al. | 709/229 |
| 6,546,397 B1* | 4/2003 | Rempell | 707/102 |
| 6,549,397 B1 | 4/2003 | Diaz et al. | |
| 6,560,592 B1 | 5/2003 | Reid et al. | |
| 6,567,846 B1* | 5/2003 | Garg et al. | 709/218 |
| 6,611,498 B1 | 8/2003 | Baker et al. | |
| 6,615,253 B1* | 9/2003 | Bowman-Amuah | 709/219 |
| 6,623,529 B1 | 9/2003 | Lakritz | |
| 6,625,581 B1* | 9/2003 | Perkowski | 705/27 |
| 6,631,357 B1* | 10/2003 | Perkowski | 705/26 |
| 6,632,251 B1* | 10/2003 | Rutten et al. | 715/530 |
| 6,636,886 B1* | 10/2003 | Katiyar et al. | 709/203 |
| 6,643,652 B2 | 11/2003 | Helgeson et al. | |
| 6,654,726 B1* | 11/2003 | Hanzek | 705/26 |
| 6,662,342 B1 | 12/2003 | Marcy | |
| 6,664,981 B2 | 12/2003 | Ashe et al. | |
| 6,671,674 B1* | 12/2003 | Anderson et al. | 705/26 |
| 6,684,369 B1 | 1/2004 | Bernardo et al. | |
| 6,694,506 B1 | 2/2004 | LeBlanc et al. | |
| 6,704,906 B1 | 3/2004 | Yankovich et al. | |
| 6,728,685 B1* | 4/2004 | Ahluwalia | 705/26 |
| 6,732,331 B1 | 5/2004 | Alexander | |
| 6,741,969 B1* | 5/2004 | Chen et al. | 705/14 |
| 6,741,980 B1* | 5/2004 | Langseth et al. | 707/2 |
| 6,742,015 B1 | 5/2004 | Bowman-Amuah | |
| 6,745,203 B1* | 6/2004 | Garg et al. | 707/103 R |
| 6,751,673 B2* | 6/2004 | Shaw | 709/231 |
| 6,769,009 B1* | 7/2004 | Reisman | 709/201 |
| 6,771,384 B1 | 8/2004 | Laverty et al. | |
| 6,779,155 B1 | 8/2004 | Bahrs et al. | |
| 6,785,721 B1 | 8/2004 | Immerman et al. | |
| 6,792,462 B2 | 9/2004 | Bernhardt et al. | |
| 6,802,059 B1 | 10/2004 | Lyapustina et al. | |
| 6,807,558 B1* | 10/2004 | Hassett et al. | 709/203 |
| 6,820,082 B1 | 11/2004 | Cook et al. | |
| 6,832,369 B1 | 12/2004 | Kryka et al. | |
| 6,842,906 B1* | 1/2005 | Bowman-Amuah | 719/330 |
| 7,013,289 B2 | 3/2006 | Horn et al. | |
| 2001/0039594 A1 | 11/2001 | Park et al. | |
| 2001/0044809 A1 | 11/2001 | Parasnis et al. | |
| 2002/0107684 A1 | 8/2002 | Gao | |
| 2002/0147656 A1* | 10/2002 | Tam et al. | 705/26 |
| 2002/0156678 A1* | 10/2002 | Adams | 705/14 |
| 2002/0161674 A1* | 10/2002 | Scheer | 705/28 |
| 2003/0033448 A1 | 2/2003 | Kieffer | |
| 2003/0078960 A1 | 4/2003 | Murren et al. | |
| 2003/0233296 A1 | 12/2003 | Wagner | |
| 2004/0039993 A1 | 2/2004 | Kougiouris et al. | |
| 2004/0205575 A1 | 10/2004 | Wattenberg | |
| 2004/0205644 A1 | 10/2004 | Shaughnessy et al. | |
| 2005/0055633 A1 | 3/2005 | Ali et al. | |

OTHER PUBLICATIONS

Derfler, Frank J. et. al. How Networks Work, Millennium Ed., Que Corporation, Jan. 2000.*

Gralla, Preston, How the Internet Works, Millennium Ed., Que Corporation, Aug. 1999.*

Borland's Paradox for Windows User's Guide, Borland International, Inc, 1994.*

Muller, Nathan J., Desktop Encyclopedia of the Internet, Artech House, Inc., 1998.*

Gavron, Jacquelyn, et. al., How to Use Micosoft Windows NT 4 Workstation, Macmillian Computer Publishing, USA, 1996.*

Bragg, Steven M., Accounting Best Practices, John Wiley and Sons, Inc., 1999.*

Belge, "The Next Step in Software Internationalization," Jan. 1995, Interactions, vol. 2, Issue 1, pp. 21-25.

de Mauro, "Internationalizing Messages in Linus Programs," Mar. 1999, Linux Journal, vol. 1999, Issue 59es, Article No. 4, ISSN 1075-3583, 10 pages.

"Developer's Guide to Internationalization," 1995, Sun Microsystems, Inc., Mountain View, CA, pp. i-xiv and 1-80.

Gilly, Daniel. "Unix in a Nutshell: A Desktop Quick Reference for System V and Solaris 2.0," O'Reilly & Associates, 1992, pp. 10-1 to 10-11, 11-1 to 11-12.

Lemay, et al, "Laura Lemay's Workshop Javascript," 1996, Sams.net, pp. 132-137.

"OpenWindows Developer's Guide: XView Code Generator Programmer's Guide," Product Manual, 1994, Sun Microsystems Inc., Mountain View, CA, Chapter 1, and Appendix B.

Peek, et al., "Unix Power Tools," O'Reilly & Associates, 1997, pp. 875-879.

Pominville, et al., "A Framework for Optimizing Java Using Attributes," Proceedings of the 2000 Conference of the Centre for Advanced Studies on Collaborative Research, 2000, pp. 1-17.

Robbins, "Effective awk Programming," 3rd Edition, May 2001, O'Reilly & Associates, ISBN 0-596-00070-7, Chapter 9, 15 pages.

Robbins, "Gawk 3.1 New Feature List," Sep. 3, 2000, Usenet newsgroup comp.lang.awk as archived on <<http://groups.google.com>>, accessed and printed on Mar. 18, 2005, 3 pages.

Stephens, "Prototyping with Visual Basic," Sep. 2001, Sams Publishing, ISBN 0-7897-2578-9, Chapter 9, 6 pages.

Stevens, "Unix Network Programming," New Jersey, Prentice Hall, 1990, pp. 7, 31, 32, 72-85, 250, 259, 261-267, 271, 334-341, 430-436.

Tuthill, et al, "Creating Worldwide Software: Solaris International Developer's Guide," Sun Microsystems Press, 1997, 2nd Edition, 13 pages.

Usdin, et al., "XML: Not a Silver Bullet, But a Great Pipe Wrench," published by Standard View, vol. 6, No. 3 Sep. 1998, pp. 125-132.

Lawhead, "Flexible Formatting of Messages for Display," IBM Technical Disclosure Bulletin, vol. 14, Issue 1, Jun. 1, 1971, pp. 46-48.

"SMT in Line", available at <<www.smtinline.com>>, accessed on Apr. 28, 2006, 2 pages.

* cited by examiner

| | ITEM IDENTIFIER | SUBSCRIBER | DATE RANGE | STATUS | ARCHIVE |
|---|---|---|---|---|---|
| 602(1) → | A3452 | SUBSCRIBER(1) | 1/1/01 - 6/1/01 | ACTIVE | |
| | A3452 | SUBSCRIBER(2) | 1/1/01 - 3/1/01 | ACTIVE | |
| | X362Y1 | SUBSCRIBER(3) | N/A | RESERVED | |
| 602(e) → | | | | | |

MAINTAINING SYNCHRONIZATION OF INFORMATION PUBLISHED TO MULTIPLE SUBSCRIBERS

TECHNICAL FIELD

The present invention is directed to information management, and more particularly to maintaining synchronization of information published to multiple subscribers.

BACKGROUND

As computing technology has advanced, computers have become increasingly coupled together via various networks. This increased ability to communicate with other computers provides many advantages, allowing data to be quickly communicated to friends, colleagues, or even strangers throughout the world.

One specific use of this increased communication ability is for the sale of goods. Individual companies can make their goods available for sale over a network, such as the Internet, allowing individual users to view descriptions of, and purchase, the goods at their leisure. Additionally, on-line auction houses have also been established, allowing individual users to list various goods for sale and allow other users to bid on those goods.

However, problems exist in attempting to use these mechanisms for the sale of goods in environments where multiple different sellers attempt to sell the same good. Mechanisms to support the offer for sale of the same good by multiple different sellers and to ensure accurate and up-to-date information regarding the goods (e.g., whether the good has been sold by one of the sellers) do not currently exist. It would thus be desirable to have a technique to improve the ability of multiple different sellers to offer the same good for sale.

SUMMARY

Maintaining synchronization of information published to multiple subscribers is described herein.

Information describing one or more items is published to multiple subscribers. A subsequent change to the information requested by one of the multiple subscribers (such as a change in the status of an item corresponding to the information) is communicated to each of subscribers to which the information was previously published.

BRIEF DESCRIPTION OF THE DRAWINGS

The same reference numbers are used throughout the figures to reference like components and features.

DETAILED DESCRIPTION

An information tracking and publication system maintains information synchronization among multiple subscribers. Examples of different types of information that can be published include asset descriptions, goods and/or services descriptions, content (e.g., news stories, customer/user information, etc.), and so forth. Different subscribers can subscribe to receive different information from the publication and tracking system, and different subscribers can receive overlapping information. Changes made to particular information by one of the subscribers is made available to all subscribers of that information.

Figure 1:
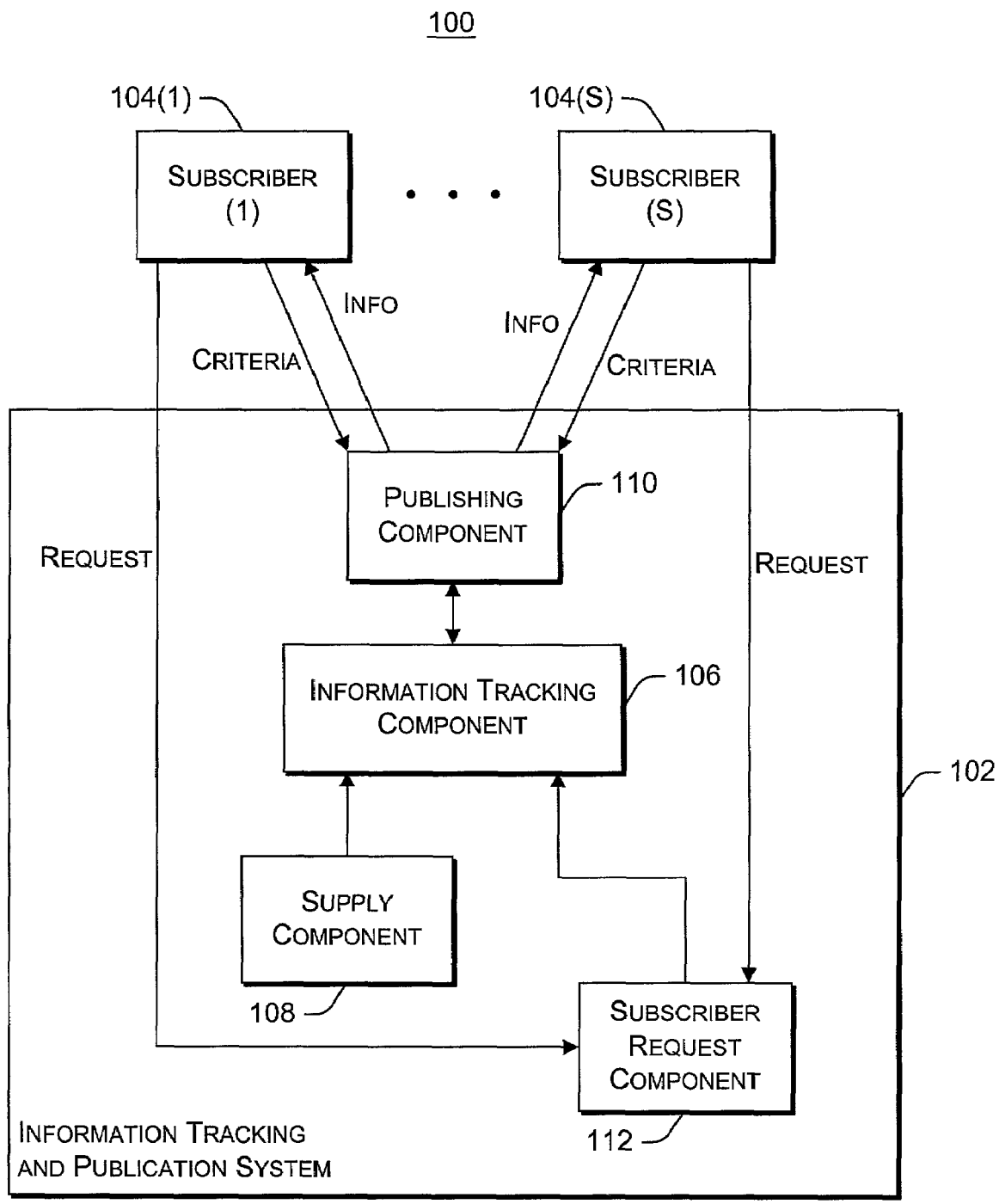
FIG. 1 illustrates an exemplary information tracking and publication environment.

FIG. 1 illustrates an exemplary information tracking and publication environment 100. The environment 100 includes an information tracking and publication system 102 and multiple subscribers 104(1), . . . , 104(S). The tracking and publication system 102 includes an information tracking component 106 that maintains a database of item descriptions that are available from the system 102, such as asset descriptions, news stories, descriptions of goods and services, and so forth. For purposes of explanation, many of the examples illustrated herein are described with reference to the information in environment 100 being asset descriptions. It is to be appreciated that this is exemplary only, and that many different types of information can be used in the environment 100.

The communication among the system 102 and the subscribers 104 can be implemented via one or more different types of networks (e.g., Internet, local area network, wide area network, telephone, etc.), including wire-based technologies (e.g., telephone line, cable, etc.) and/or wireless technologies (e.g., RF, cellular, microwave, IR, wireless personal area network, etc.). Such networks can be configured to support any number of different protocols, including HTTP (HyperText Transport Protocol), TCP/IP (Transmission Control Protocol/Internet Protocol), WAP (Wireless Application Protocol), and so on. In one implementation, one or more of the subscribers 104 support the World Wide Web (or simply "the web"), which is a collection of documents (also referred to as web pages) that include hypertext links to other documents.

The system 102 and the subscribers 106 can be implemented in a number of ways, including as personal computers (e.g., desktop, laptop, palmtop, etc.), communications devices, personal digital assistants (PDAs), entertainment devices (e.g., Web-enabled televisions, gaming consoles, etc.), other servers, and so forth. Additionally, the functionality of both the system 102 and the subscribers 106 can be implemented on a single computing device, or alternatively distributed over multiple computing devices (of the same or different types). Such computing devices have a variety of components, including processing units, one or more types of memory (e.g., RAM, ROM, disk, RAID storage, etc.), input and output devices, and a busing architecture to interconnect the components.

The information tracking and publication system 102 includes a supply component 108 that receives information from one or more different sources that is to be maintained in the information tracking component 106. The information tracking component 106 maintains two databases: an information tracking database and a publishing database. These databases are used to publish and track and publish items of information, as discussed in more detail below.

The tracking component 106 makes information from its databases available to the subscribers 104 via a publishing component 110. The various subscribers 104 register, with the publishing component 110, their specific criteria that identifies the particular information in the information tracking database of component 106 that they want to receive. For example, the information tracking and publication system 102 may have a database of vehicle asset information describing vehicles available for sale. Different subscribers 104 may wish to receive information about different groupings of these vehicles: one subscriber may wish to receive information about only Ford vehicles, another subscriber may wish to receive information about any vehicles priced below $5,000, another subscriber may wish to receive information about only pickup trucks, another subscriber may wish to receive information about any used vehicle, and so forth. These different subscribers register these different criteria with the publishing component 110.

The publishing component 110 uses the different criteria it receives from the subscribers 104 to determine which information from the information tracking component 106 to communicate to the individual subscribers. The publishing component 110 effectively filters the information from the information tracking component 106 and publishes to each subscriber 104 only the information that satisfies that subscriber's criteria.

The subscribers 104 receive the published information from the publishing component 110, and then use the received information in whatever manner they desire. Typically, the subscribers 104 store the received information locally for subsequent user accesses. The information that is stored locally (including additions to the information, changes to the information, and deletions of the information) is identified to the subscribers 104 from the publishing component 110, as discussed in more detail below. Examples of uses of the received include: using the information internally (e.g., a large corporation making purchasing decisions), making the information available to others (e.g., a web page that provides the information to any requesting user via the Internet (or only registered users), hard copy flyers describing the information), and so forth.

The subscribers 104 can also communicate requests regarding the information communicated (published) to them back to the system 102 via a subscriber request component 112. These requests cause the system 102 to alter the information stored in the tracking component 106, such as a request from one of the subscribers 104 to purchase an asset published to that subscriber. These subscriber requests are received by the subscriber request component 112 and processed to bring about the alterations to the information stored in the tracking component 106. The publishing component 110 then communicates the changes to the subscribers 104 that have registered for that information. Thus, any changes made to information in the database of tracking component 106 are propagated out (via the publishing component 110) to the various subscribers 104 affected by the change. For example, if a subscriber 104 submits a request to purchase a $4,000 used Ford car identified in the information stored in information tracking component 110, the corresponding change to the information in the database (that is, that the car is no longer available for sale) is communicated via the publishing component 110 to the subscribers 104 that had registered to receive information about that car (e.g., the subscribers 104 that had registered to receive information about used cars, about Ford cars, about cars costing less than $5,000, etc.).

Figure 2:
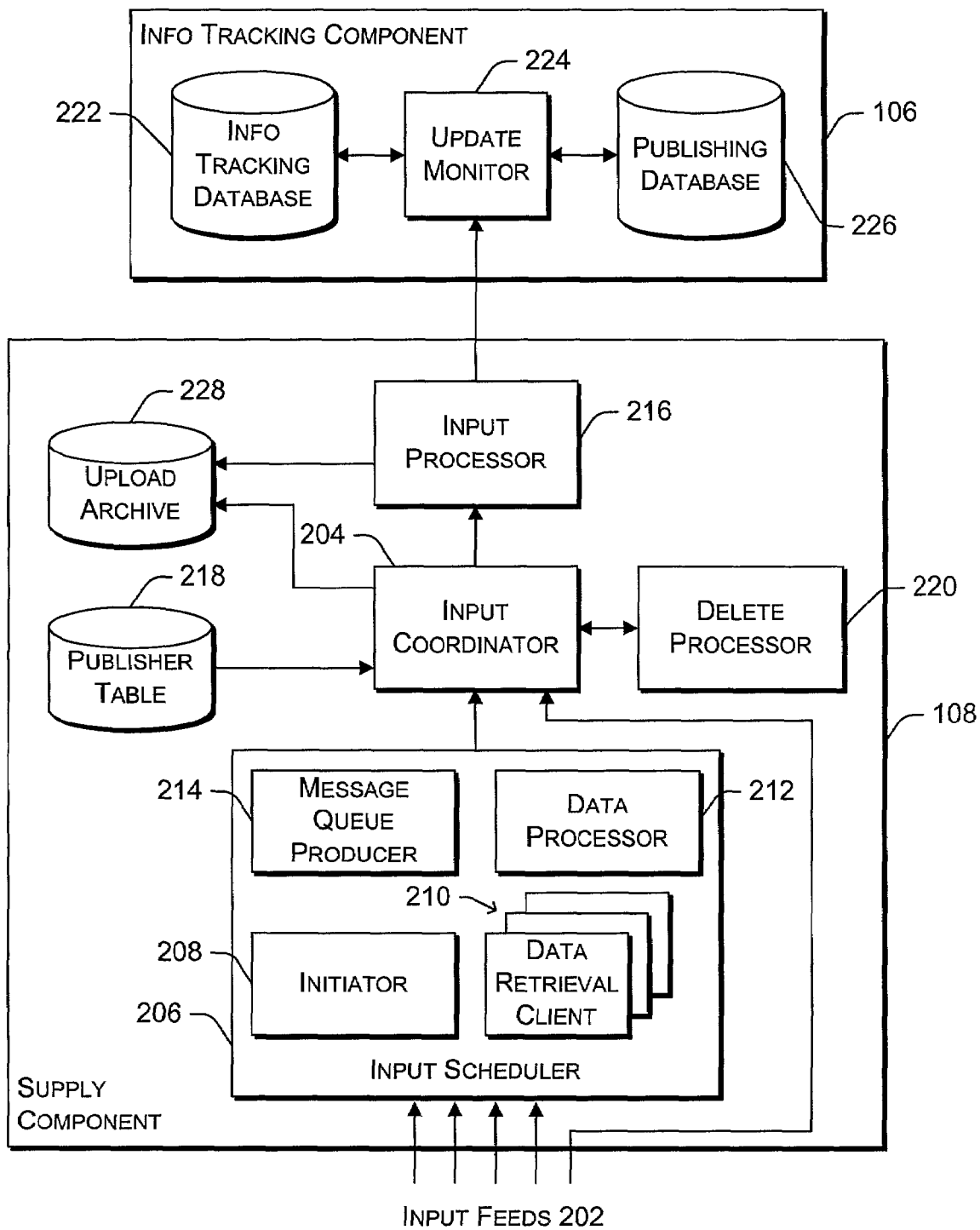
FIG. 2 is a block diagram illustrating an exemplary supply component of FIG. 1 in additional detail.

FIG. 2 is a block diagram illustrating an exemplary supply component 108 of FIG. 1 in additional detail. Generally, the supply component 108 operates to provide a standard framework for getting data into a database of the information tracking component 106 from multiple sources in multiple formats, including adding information to the database, updating information in the database, and deleting information from the database.

The supply component 108 receives one or more input feeds 202 that are input to either an input coordinator 204 or an input scheduler 206. The input feeds 202 represent any of a wide variety of sources of information that can be maintained in the information tracking component 106. Examples of such sources include other information tracking and publication systems analogous to system 102, other databases or computing devices, and so forth. Data can be received from these various sources in any of a wide variety of conventional formats, such as message queue (MQ) based communications via a network, a continuous stream of information via a network, a list of records stored in a file (e.g., on a removable magnetic or optical disk), an inter-process communication (e.g., a remote procedure call to a software module or object of the supply component 108), and so forth.

Which of coordinator 204 or scheduler 206 a particular input feed 202 is input to is dependent on the manner in which the input feed 202 provides data. If an input feed 202 provides data in a format that is understood or expected by the coordinator 204, then the input feed 202 can be input directly to the input coordinator 204; otherwise, the input feed 202 is input to the input scheduler 206 where it is converted to a format understood or expected by the input coordinator 204. Alternatively, even if the input feed 202 provides data in a format that is understood or expected by the input coordinator 204, the input feed 202 may still be input to the input scheduler 206 in order to control (by scheduler 206) when the data is provided to the input coordinator 204.

The supply component 108 optionally includes multiple input schedulers 206. Each input scheduler can be specifically tailored to a particular one of the input feeds 202. Alternatively, a single input scheduler 206 can be used that is able to manage data received from multiple different input feeds 202.

The input scheduler 206 includes an initiation module 208, one or more data retrieval clients 210, a data processor 212, and a message queue producer 214. The initiation module 208 invokes the appropriate one (if multiple) input scheduler 206 based on specified conditions in order to receive data from one of the input feeds 202. The specified conditions can be particular times (e.g., an agreement between system 102 and a data source that data will be provided at a particular time of the day or week) or in response to particular conditions (e.g., the initiation module 208 detecting the presence of one or more files in a particular local or remote location).

The one or more data retrieval clients 210 manage the retrieval of data for one of the input feeds 202. The exact nature of the clients 210 varies depending on the manner in which the input feed provides data. Examples of data retrieval clients 210 include ftp (file transfer protocol) clients, a lightweight process (LWP) client, a file reader, and so forth.

The data processor 212 reads data retrieved by the data retrieval client(s) 210 and converts the data into a message format. In the illustrated example, the input coordinator 204 expects to receive data in a message format, so the data processor converts the data retrieved by the client(s) 210 into a message format. If the input coordinator 204 expected to receive data in another format then the data processor 212 would convert the data to that format. Any of a variety of message formats could be used, such as the MQ format, eXtended Markup Language (XML), a "flat file" (a file of data that does not contain any linkages or pointers to another file), and so forth. The message queue producer 214 then uses the data in message format from the data processor 212 and generates messages for consumption by the input coordinator 204.

The input coordinator 204 processes messages received from the input scheduler(s) 206 and/or the input feeds 202 to transform or translate the messages into a standard format. The transformed messages are then communicated to an input processor 216 for adding to the database of the information tracking component 106. In one implementation, the input coordinator 204 transforms messages into a standard format such as XML. Alternatively, other formats could be used, including proprietary non-standard formats, the MQ format, XML, flat files, and so on. A publisher table 218 is programmed with the necessary information to translate data from one message format into the desired format for the input processor 216. The input coordinator 204 accesses the publisher table 218 to obtain this translation information and uses the information to perform the translation.

The messages output by the input coordinator 204 to the input processor 216 include a data portion and an operation portion. The data portion includes the data received from the source, and the operation portion identifies the operation to be performed by the input processor 216 using the data in the data portion. The operation to be performed is indicated by the data received from the source (although it may be transformed into a particular operation command by the input coordinator 204). An exemplary set of operations that may be identified in these messages for use with an asset tracking database is illustrated in Table 1.

TABLE 1

| Operation | Description |
|---|---|
| Insert | Add the item identified in the message to the database. |
| Update | Update an item in the database with the data in the message. |
| Delete | Delete an item identified in the message from the database. |
| Refresh | Directs the input processor 216 to perform, with the data identified in the message, either an insert operation (if an item for the data is not already in the database) or an update operation (if an item for the data is already in the database). |
| Sold | Delete or update the status of an item in the database (the input processor 216 could be programmed either way). |
| Sale Pending | Delete or update the status of an item in the database (the input processor 216 could be programmed either way). |

Situations can arise where the input coordinator 204 bases decisions on which operation to include in the operation portion of a message on the items of the information tracking database in the information tracking component 106. In these situations, the input coordinator 204 obtains the appropriate information from the information tracking database in order to determine the proper operation. For example, the input coordinator 204 may receive data via one of the input feeds 202 to update an item in the database. In this situation, the input coordinator 204 communicates with the information tracking database to determine whether the item already exists in the database. If the item already exists then the update operation is forwarded to the input processor 216; otherwise the input coordinator 204 detects an error condition and does not forward the update operation to the input processor 216.

The input coordinator 204 optionally returns a response to the data sources. Such responses can indicate, for example, whether the data was communicated to the database or whether there was an error in the received data (e.g., the message was in a format that the input coordinator 204 could not transform).

The input coordinator 204 may also optionally communicate with a delete processor 220 to assist in generating the messages to be communicated to the input processor 216. Situations can arise where data received from a source indicates that an item is to be deleted from the information tracking database but no explicit delete request is communicated from the source. For example, the system 102 may be designed to receive input feeds 202 that are complete sets of assets—any asset that is already in the information tracking database but is not identified in a received feed is to be deleted from the database. In this example, the delete processor 220 works with the input coordinator 204 to generate item delete messages to communicate to the input processor 216.

In one implementation, the delete processor 220 operates as follows. Upon beginning processing of a set of messages from an input source, the input coordinator 204 sends a "checkpoint" message to the delete processor 220. In response to the checkpoint message the delete processor obtains from the information tracking database a set of all item identifiers that are identified in the information tracking database as having a source the same as the input source of the set of messages. These identifiers are then stored in a local cache of the delete processor 220. As the input coordinator 204 processes messages from the set, the coordinator 204 sends a "mark" message to the delete processor for each message it processes. Upon receipt of a mark message the delete processor 220 removes the corresponding item identifier from its local cache. When the input coordinator 204 is finished processing the set of messages it sends a "flush" message to the delete processor 220. In response to the flush message, the delete processor 220 generates a delete message for each item identifier still in its local cache (if any) and forwards the delete messages to the input coordinator 204, which in turn forwards the delete messages to the input processor 216.

The input processor 216 receives requests from the input coordinator 204 and updates the information tracking database 222 of the information tracking component 106. The input processor processes requests in the order they are received from the input coordinator 204, and performs the operation identified in each request on the database 222. The input processor 216 may also optionally return a status of the request (e.g., success or failure) to the input coordinator 204 (e.g., for return to the appropriate data source).

The input processor 216 updates the information tracking database 222 of the information tracking component 106 via an update monitor 224. The update monitor 224 passes the received database update actions directly to the information tracking database 222, and also updates a publishing database 226 based on the monitored actions. The publishing database 226 is used by the publishing component 110 for publishing information to the various subscribers, as discussed in more detail below.

In one implementation, three database update operations can be performed on the database 222 by the input processor 216: an insert operation, an update operation, and a delete operation. The insert operation adds an item to the database 222. The information for the item to be added is included in the data portion of the message received from the input coordinator 204. The input processor 216 also generates a unique identifier (unique within the system 102) for the new item and includes the identifier in the database 222. The update operation changes the information of an item in the database 222. The item whose information is to be changed, as well as the new information for the item, is identified in the data portion of the message received from the input coordinator 204. The delete operation deletes an item from the database 222. An identification of the item to be deleted is included in the data portion of the message received form the input coordinator 204.

Both the coordinator 204 and the input processor 216 also store statistics and error indications in an upload archive 228. Any of a wide variety of information can be stored by the input coordinator 204 in the upload archive 228 for monitoring or evaluation of the operation of the supply component 108. Examples of the information stored in the upload archive 228 include: (1) the date, time, number of items inserted, number of items deleted, and number of items updated for each time an input feed is processed (e.g., each set of messages received from the input scheduler 206 for a particular input feed 202); (2) errors generated by the input processor as it processes messages received from the input coordinator 204; and (3) errors generated by the input coordinator 204 if it cannot transform the input feed into the standard format.

Figure 3:
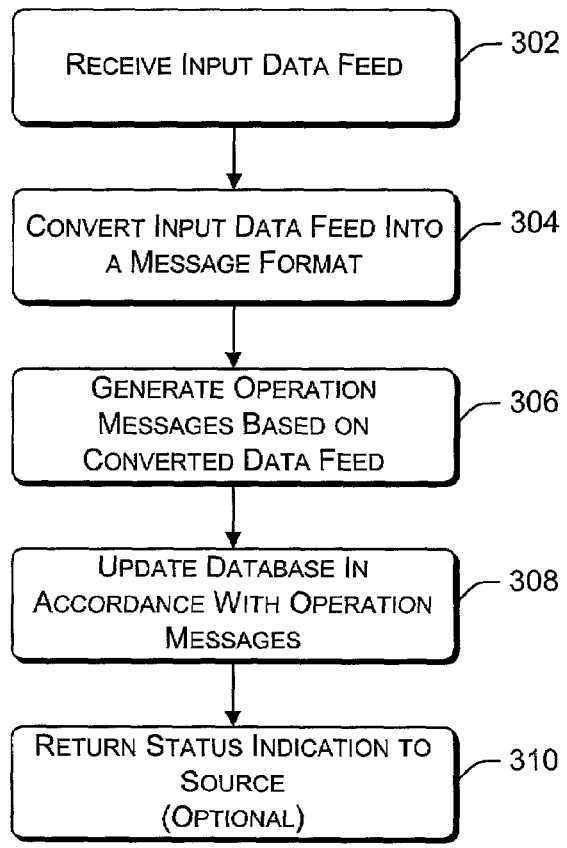
FIG. 3 is a flowchart illustrating an exemplary process for updating an information database.

FIG. 3 is a flowchart illustrating an exemplary process 300 for updating an information database. The process 300 is implemented as a software process of acts performed by execution of software instructions. Accordingly, the blocks illustrated in FIG. 3 represent computer-readable instructions, that when executed by a computing device implementing the supply component 108, perform the acts stipulated in the blocks.

In block 302, an input data feed is received. In block 304, the data feed is converted into a message-based format. In block 306, one or more operation messages (e.g., insert, update, and delete) are generated based on the converted data feed. In block 308, the database is updated in accordance with the operation messages. In block 310, an optional status indication is returned to the source of the input data feed.

Figure 4:
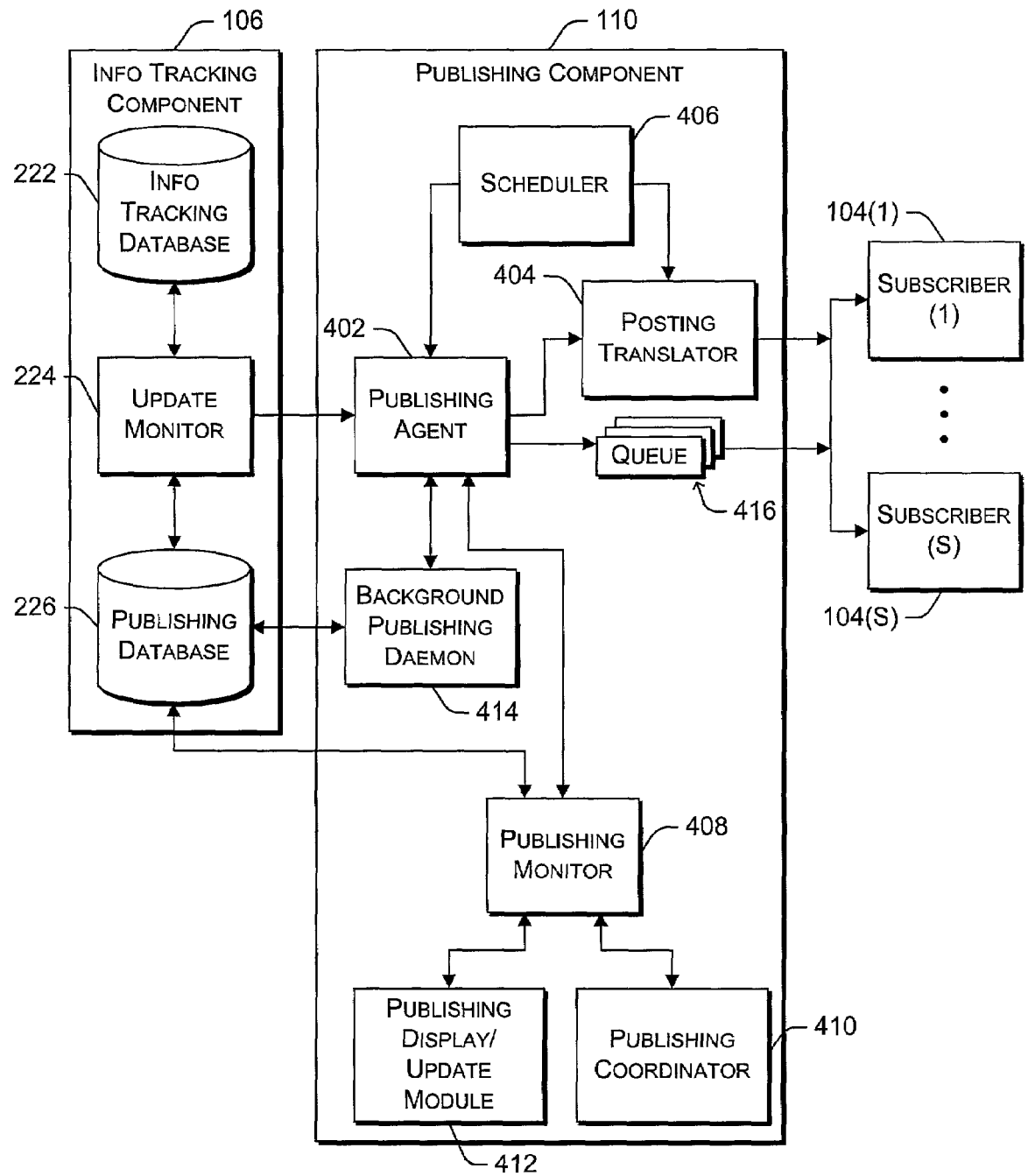
FIG. 4 is a block diagram illustrating an exemplary publishing component of FIG. 1 in additional detail.

FIG. 4 is a block diagram illustrating an exemplary publishing component 110 of FIG. 1 in additional detail. Generally, the publishing component 110 operates to communicate information from the information tracking component 106 to the subscribers 104, as well as track what information is communicated to which subscribers 104.

The publishing component 110 uses the publishing database 226 to track the information that has been published (communicated) to the various subscribers 104. The publishing database 226 is illustrated as being part of the information tracking component 106, although alternatively the database 226 may be part of the publishing component 110.

Each entry in the publishing database 226 corresponds to item information from the information tracking database 222. In the illustrated example, the publishing database 226 maintains identifiers of the published item information, but not all of the item information from the information tracking database 222. Based on the item identifier in the publishing database 226, another component can access the tracking database 222 in order to obtain all of the item information.

Figures 5, 6:
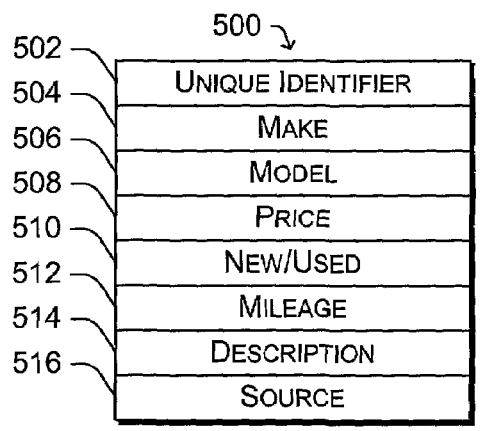
FIG. 5 illustrates an exemplary item information format for use in an information tracking database that is maintaining vehicle asset information.
FIG. 6 illustrates items in an exemplary publishing database used in conjunction with an information tracking database.

FIG. 5 illustrates an exemplary item information format for use in an information tracking database 222 that is maintaining vehicle asset information. The items thus are vehicles and the database 222 maintains information describing the various vehicles. The information format 500 includes an identifier 502 that uniquely identifies the item within the information tracking and publication system 102 of FIG. 1. For the example of vehicle asset information, the information format 500 also includes fields used to describe various aspects of vehicles: a make field 504 to identify the make of the vehicle, a model field 506 to identify the model of the vehicle, a price field 508 to identify the asking price of the vehicle, a new/used field 510 to identify whether the vehicle is new or used, a mileage field 512 to identify the current mileage of the vehicle, a description field 514 to identify any additional data describing the vehicle, and a source field 516 to identify the source of the information for the vehicle (e.g., the source via one of the input feeds 202 of FIG. 2).

FIG. 6 illustrates items in an exemplary publishing database 226 used in conjunction with the information tracking database 222. The publishing database 226 includes multiple entries 602(1), ..., 602(e), one for each subscriber of each published item. Each entry 602 includes an item identifier field 604 to identify an item (and the item information in the information tracking database 222), and a subscriber field 606 to identify one of the subscribers 104. Multiple optional fields may also be included in the publishing database 226, such as a date range field 608, a status field 610, and an archive field 612. The archive field 612 is to keep track of additional information regarding the identified item (e.g., its history, such as previous canceled sales of the item).

The date range field 608 is used to identify starting and/or ending dates (arid/or times) for subscriptions. A subscription refers to a period of time that an item is available for being published. In the illustrated example of FIG. 6 the date range field 608 is illustrated as including specific dates. Alternatively, the date range field 608 may include a reference (e.g., a variable or pointer) to a date range definition or object. By using such a reference, a single date range can be defined and applied to multiple different items by using the reference. Subsequent changes to the date range can then be made by simply changing the date range object rather than changing each item in the publishing database 226 affected by the change.

The status field 610 is used to identify the current status of the item. Examples of the current status of an item include: whether the item is active or deferred (e.g., based on the date range—if the current date is prior to the begin date of the date range, then the item is deferred; if the current date is after the end date of the date range, then the item is inactive; otherwise, the item is active), whether there is currently a sale pending on this item, whether the item has already been sold, whether the item is "reserved", and so forth. The reserved status is used to allow an item to be temporarily reserved for use by a particular subscriber. For example, one subscriber 104 may be an auction house that desires to auction the particular item. The item would be listed as "reserved" in the publishing database 226 for the duration of the auction. If the item were not sold in the auction, then the status would be changed to "active". However, if the item were sold in the auction, then the status would be changed to "sold".

Returning to FIG. 4, the information from the component 106 to be communicated to a particular subscriber 104 is based on criteria specified by that subscriber. Each subscriber 104 is able to define its own criteria in terms of each information field included in the item information of database 222. For example, using the information format 500 of FIG. 5, a subscriber could identify particular vehicle makes, particular vehicle models, particular vehicle prices, etc. The criteria can be specified in different manners, and may include specific values (e.g., a vehicle make of "Ford"), ranges of values (e.g., a vehicle price of "$2,000-$5,000"), wildcards (e.g., a vehicle description of "*AC*" to indicate only vehicles that include "AC" somewhere in their description).

The criteria for each subscriber 104 can be input to the publishing component 110 (or alternatively other component of system 102) in a variety of different manners. In one implementation, the criteria is manually input by a system operator (e.g., as part of a sign-up process of the subscriber). Subsequent changes to the criteria can also be made manually. Alternatively, the criteria could be automatically identified to the publishing component 110 (initially and/or subsequent changes to the criteria). For example, messages could be communicated from the subscriber to the publishing component 110, or a log-on procedure could be used to allow the subscriber to log on to the system 102 (e.g., using a log on ID and password) and input criteria.

The publishing component 110 includes a publishing agent 402, a posting translator 404, a scheduler 406, a publishing monitor 408, a publishing coordinator 410, a publishing display/update module 412, and an optional background publishing daemon 414. The publishing agent 402 receives requests from other modules of the publishing component 110 and notifies subscribers 104 of information in the database 222 (as well as changes to information in the database 222) based on these requests. This notification can be publication of new item information, updating of previously published item information, or deletion of previously published item information. The requests received by the publishing agent 402 identify a specific item and subscriber, or alternatively a group of subscribers and/or items. Based on the received request, the publishing agent 402 accesses the publishing database 226 and the information tracking database 222 as appropriate to obtain the information about the item(s), and then generates one or more messages to communicate to the subscriber(s) 104. Each message communicated by the publishing agent 402 may refer to a single item or alternatively a group of multiple items.

For example, the publishing agent 402 may receive a request to publish a message for a new item whose information is stored in the database 222. In response, the publishing agent 402 accesses the new information and generates a message for each subscriber identified by the request informing the subscriber of the new item information (alternatively, the publishing agent 402 may access the criteria for each subscriber and automatically determine which subscribers are to receive a notification of the new item information based on their established criteria). By way of another example, the publishing agent 402 may receive a request to delete an item whose information is stored in the database 222. In response, the publishing agent 402 generates a message for each subscriber identified by the request informing the subscriber of the item information to be deleted.

The publishing agent 402 can send messages in a batch mode and/or a non-batch mode. When operating in batch mode, the publishing agent is invoked by the scheduler 406. The scheduler is programmed to invoke the publishing agent 402 at particular times, such as during typical "off-hours", at the same time (e.g., noon or 3 am) every day or only select days, according to some specified schedule (e.g., Tuesdays and Thursdays at 3 am and Mondays and Saturdays at 1 pm), every ten hours, and so forth. Any messages generated in response to requests received by the publishing agent 402 are queued locally by the agent 402 until invoked by the scheduler 406.

When invoked, the publishing agent also executes a query for each subscriber 104. The query for each subscriber is based on the criteria input by that subscriber describing what items it wants to receive information about. The criteria can be stored in the information tracking database 222, or alternatively elsewhere (e.g., a dedicated storage area of the publishing component 110). The results of the query are placed in (or returned in) an XML document that is packaged as a message and placed in a message queue 416 of the subscriber. The messages can be implemented using any of a variety of message-based technologies, including Java Messaging Service (JMS), MQ, and so forth. The subscribers detect the new messages in their respective queues and retrieve the messages from the publishing agent 402.

In some situations, one or more subscribers 104 may not support direct messaging and thus may not be able to access the message queue 416. In this situation, the posting translator 404 is used to assist in publishing messages to those subscribers. The posting translator 404 monitors the message queues 416 of those subscribers 104 that do not support direct messaging. When the posting translator 404 detects a new message in one of those queues 416, the posting translator 404 removes the message from the queue 416 on the subscriber's behalf and converts the message into a format specified for that subscriber. The posting translator 404 then communicates the converted message to the subscriber using the delivery mechanism specified for that subscriber. The posting translator 404 can convert the message into a variety of different formats (e.g., any of a variety of files or data structures) and use any of a variety of delivery mechanisms (e.g., ftp clients, LWP clients, simple file writers, HTTPS, etc.). The format and delivery mechanism for a particular subscriber can be specified in a variety of different manners (e.g., manually or automatically indicated when the subscriber is initially added to the system or at some later time).

When operating in non-batch mode, the publishing agent 402 receives a request from another module in the publishing component 110, the agent 402 processes the request by extracting the appropriate information from the databases 222 and/or 226 and then generating a message for publication to the appropriate subscriber(s) analogous to the batch-mode discussed above.

The publishing agent 402 may also receive requests from the update monitor 224 of the information tracking component 106. The update monitor 224 operates to insure that modifications made to the information tracking database 222 are reflected in the publishing database 226 and passed on to the publishing agent 402. Although only one monitor 224 is illustrated, alternatively multiple monitors may exist (e.g., a different monitor for each type of information stored in the database 222, such as one monitor for asset information and another for subscriber information).

When a change is made to information in the information tracking database 222, the update monitor 224 takes different actions based on whether the change is a deletion of information or an update of information. When a request to delete an item from the asset tracking database 222 is received, the update monitor 224 queries the publishing database 226 to determine all of the subscribers of the item information for the item to be deleted. A delete request for each subscriber of the item information is then communicated to the publishing agent 402, which in turn sends a delete notification message to the subscribers for the item information. Each entry for the item is then deleted from the publishing database 226 (and the item information deleted from the database 222).

In one implementation, the system 102 employs a "commit" mechanism in which any changes made to a database 222 or 226 are tentative until a "commit" is issued. Any information that has not been committed to is viewed as temporary and is not relied upon by other modules. For example, a query of the database 226 would not return items that are not committed to (or alternatively would return those items but with an indication that they are not committed to). The commit mechanism can be employed in any of a variety of manners, such as the setting of a "commit" flag in each entry of the database 222 and 226 when the entry is committed to.

Using the commit mechanism, if the deletion actions taken by the update monitor 224 are successful, then the monitor 224 commits to the actions. However, if any of these actions fail, then the update monitor 224 rolls back any of the performed operations (that is, reverses the operations that were performed successfully, such as adding the entry back to the publishing database 226, or sending "add" publish requests to the publishing agent 402).

When a request to update item information in the asset tracking database 222 is received, the update monitor 224 queries the publishing database 226 to determine all of the subscribers of the item information for the item to be updated. An update request for each subscriber of the item information is then communicated to the publishing agent 402, which in turn obtains the item information from the database 222 and sends an update message to the subscribers for the item information. The update message sent to the subscribers may include all of the item information, or alternatively only the changes to the previously communicated item information (e.g., update monitor 224 can forward the monitored update action from the input processor 216 of FIG. 2 to the publishing agent 402 to identify which information is changed). The item is then updated as indicated in the information tracking database 222. If all of these update operations are successful, then monitor 224 commits the operation; otherwise it rolls back the operation.

When a request to add item information for a new item to the asset tracking database 222 is received, the update monitor 224 can be programmed to take different courses of action. In one implementation, the update monitor 224 does not notify the publishing agent 402 of the new item information (rather, it is presumed that the publishing agent 402 will discover the new item information the next time it is invoked by the scheduler 406). In another implementation, the update monitor 224 does notify the publishing agent of the new item information. In this implementation, the publishing agent 402 determines which subscribers are to receive notification of the new item information (based on their various criteria), and generates messages to be forwarded to those subscribers including the new item information.

Modifications can also be made to the publishing database 226 by the publishing coordinator 410 and the publishing display/update module 412. The publishing monitor 408 operates to insure that these modifications to the publishing database 226 are passed to the publishing agent 402 so that the appropriate subscribers are notified of the modifications. The publishing monitor 408 submits requests to the publishing agent 402 to send notifications based on the modifications to the publishing database 226 detected by the publishing monitor 408.

The publishing coordinator 410 provides an interface for a user of the information tracking and publication system 102 of FIG. 1 to view and modify the publishing database 226 as well as view (and optionally modify) the information tracking database 222. In one implementation, the publishing coordinator 410 allows a user to create/modify/delete subscribers, define and modify date range objects, and/or publish/de-publish items. Requested operations input by a user to the publishing coordinator 410 are passed to and carried out by the publishing monitor 408.

Via the publishing coordinator 410, a user is able to create new subscribers. In one implementation, the publishing database 226 stores subscriber information (e.g., identifier, preferred forms, criteria to use when querying the information tracking database 222, etc.). The information for new subscribers is input via the publishing coordinator 410. Additionally, the publishing coordinator 410 allows a user to modify previously input subscriber information, as well as delete subscribers.

The publishing coordinator 410 can also be used to define date range objects to be associated with one or more entries in the publishing database 226. As discussed above, date range objects allow the date ranges for multiple items to be modified as a group rather than individually. The publishing coordinator 410 also allows a user to modify the start and/or end dates of a date range object, and delete date range objects (although in one implementation a date range object cannot be deleted if any published items are associated with it).

The publishing coordinator 410 can also be used to publish (or de-publish) item information on an individual or group basis. To publish (or de-publish) item information for a single item, that item is identified to the publishing coordinator 410 (e.g., by its unique identifier). To publish (or de-publish) item information for a group of items, various selection criteria are input by the user and then processed by the publishing monitor 408 to determine which item information the request corresponds to. Examples of such selection criteria include a specific field(s) of the information tracking database 222, a specific field(s) of the publishing database 226, combinations of fields from both databases 222 and 226, etc.

The publishing display/update module 412 allows a user of the system 102 to view and update, via the publishing monitor 408, information from the publishing database 226. Although illustrated as a separate module, the publishing display/update module 412 may be combined with the publishing coordinator 410.

The publishing display/update module 412 allows a user to display any information from an entry of the publishing database 226. In response to such a request, the publishing monitor 408 retrieves the request information and presents it (e.g., via the module 412) to the user. Any information in an entry of the database 226 can be presented to the user, such as which subscriber item information was published to, the date ranges for an item, etc. The publishing display/update module 412 also allows the user to make changes to the status of a particular item, as well as publish (or de-publish) a particular item to (or from) one or more subscribers.

The actions taken by the publishing monitor 408 vary depending on the requested actions from the coordinator 410 and the module 412. In one implementation, the publishing monitor 408 detects and responds to three primary types of requests: a request to publish an item, a request to update an item's information in the database 226, and a request to delete information from the publishing database 226.

When the publishing monitor 408 receives a request to publish item information, the publishing monitor adds an entry into the publishing database 226 including the appropriate information (e.g., the information identifier, the subscriber, etc.). The publishing monitor 408 then determines whether the item information is to be published at the present time (based upon the item start attributes). If no start time is identified for the item then the publishing monitor 408 assumes it is to be published at the present time. If the item is to be published at the present time, then the publishing monitor 408 submits an add or publish request to the publishing agent 402, causing the publishing agent 402 to obtain the item detail from the information tracking database 222 and send a message to the appropriate subscriber(s). If these actions are performed successfully then the publishing monitor 408 returns a "success" indication to the module that submitted the request to the publishing monitor 408 and issues commits the request. However, if any of these actions fail, then the publishing monitor 408 returns a "failure" indication to the requesting module and rolls back any of the performed operations.

When the publishing monitor 408 receives a request to update an item's information in the database 226, or to delete information from the publishing database 226, the publishing monitor 408 responds in an analogous manner, except that any changes to the database 226 are made to entries already existing in the database 226, and messages sent by the agent 402 are for update requests or delete requests.

The publishing monitor 408 may also support one or more additional types of requests depending on the type of information stored in the information tracking database 222. For example, if the information is asset information then two additional types of requests that may be supported are a "sale-pending" request and a "sold" request. The publishing monitor 408 responds to these requests by updating the appropriate information in the publishing database 226 (e.g., the status and/or archive fields), and also submitting requests to the publishing agent 402 to send "sale-pending" and "sold" messages to the appropriate subscribers (these can be additional message types, or alternatively simply update messages). The manner in which these publications are handled by the subscriber is up to the preferences of the subscriber itself.

Additionally, the publishing component 110 optionally includes a background publishing daemon 414. The background publishing daemon 414 queries the publishing database 226 for items having a starting date for publishing after the last query performed by the daemon 414. The daemon 414 communicates a request to send notification of the new item to the publishing agent 402 for each item identified by the query, causing the publishing agent 402 to send messages identifying the new item information to the appropriate subscribers. Similarly, the background publishing daemon 414 also queries the database 226 for items having an ending date for publishing after the last query performed by the daemon 414. The daemon 414 communicates a request to send delete notifications to the publishing agent 402 for each item identified by the query, causing the publishing agent to send messages to delete the item information to each of the appropriate subscribers. The background publishing daemon 414 can perform its queries at different intervals, such as periodically, at random intervals, etc.

The publishing component 110 and publishing database 226 allow a great deal of control over the tracking and publishing of information from the database 222. Information about a particular item in the database 222 can be readily obtained, such as where the item information has been published, when the publishing of the item information went into effect, how long item information will be published, etc. Additionally, item information Items can be published or modified individually or in groups of one or more subscribers. Furthermore, item information for individual items or groups of items can be published automatically and subsequently removed automatically based on their associated date ranges.

Figure 7:
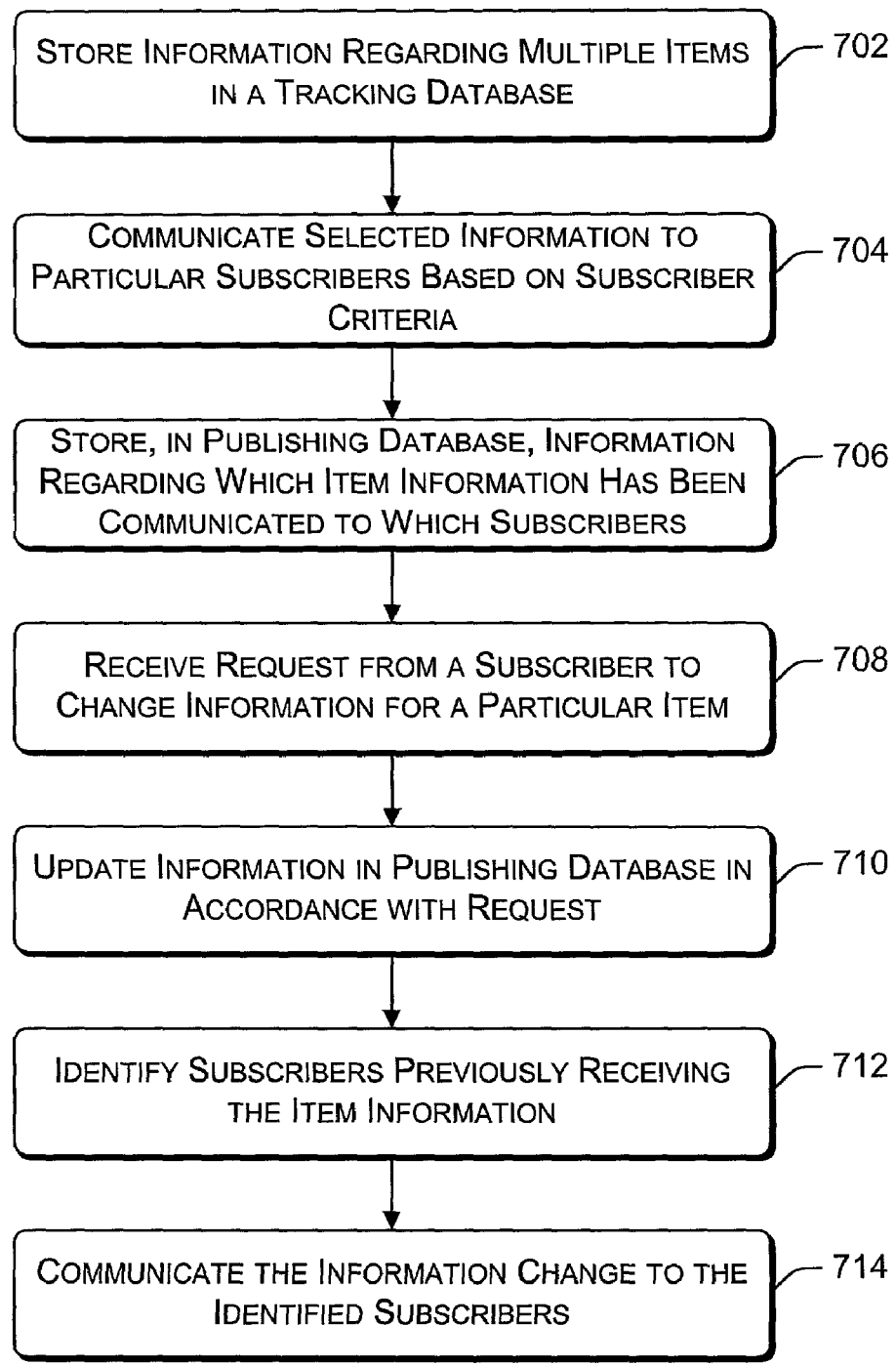
FIG. 7 is a flowchart illustrating an exemplary process for maintaining information and communicating information to subscribers.

FIG. 7 is a flowchart illustrating an exemplary process 700 for maintaining information and communicating information to subscribers. The process 700 is implemented as a software process of acts performed by execution of software instructions. Accordingly, the blocks illustrated in FIG. 7 represent computer-readable instructions, that when executed by a computing device implementing the system 102 of FIG. 1, perform the acts stipulated in the blocks.

In block 702, information regarding multiple items is stored in a tracking database. In block 704, selected information from the tracking database is communicated to particular subscribers based on the subscriber criteria, and in block 706 information regarding which item information has been communicated to which subscribers is stored in a publishing database. In block 708, a request to change information for a particular item is received from a subscriber. In block 710, the item information is updated in the publishing database in accordance with the request, and in block 712 the subscribers that previously received the item information are identified (e.g., based on the information in the publishing database). In block 714, the change to the item information is communicated to the subscribers identified in block 712.

Figure 8:
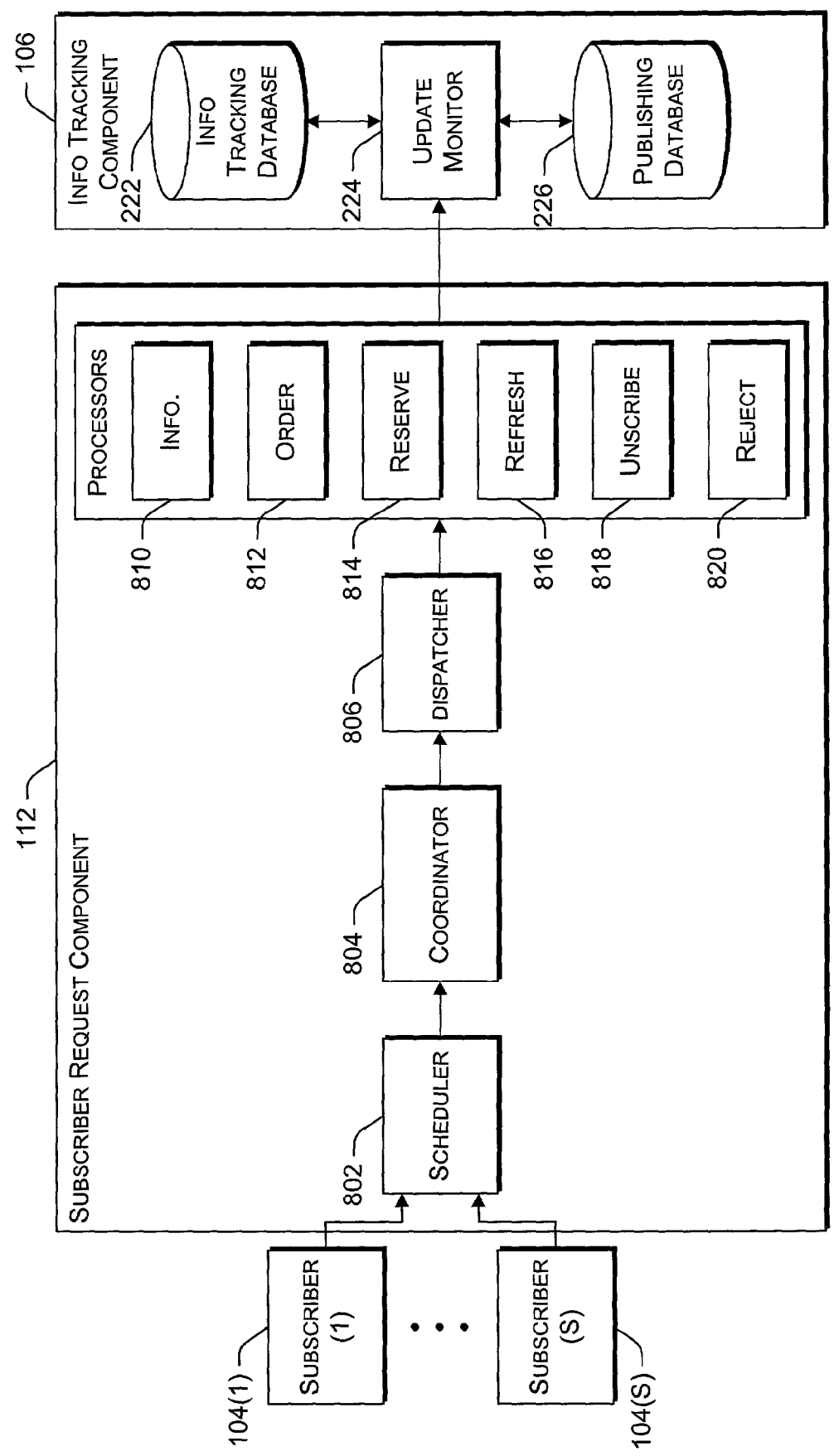
FIG. 8 is a block diagram illustrating an subscriber request component of FIG. 1 in additional detail.

FIG. 8 is a block diagram illustrating an subscriber request component 112 of FIG. 1 in additional detail. Generally, the subscriber request component 112 operates to receive requests from the various subscribers 104 and output requests to the information tracking component 106 in accordance with these requests. The subscriber request component 112 is discussed with reference to use with an asset tracking system in which the information tracking database 222 stores information regarding assets available for sale. Alternatively, the system may be used to track and publish other types of information.

The subscriber request component 112 includes a scheduler 802, a coordinator 804, a dispatcher 806 and multiple command processors 808. The scheduler 802 and the coordinator 804 operate to receive requests from the subscribers 104 and convert the requests into a format understood or expected by the dispatcher 806. The scheduler 802 and the coordinator 804 operate analogous to the input scheduler 206 and input coordinator 204 of FIG. 2 discussed above, except that they operate on requests from the subscribers 104 rather than data via input feeds. Any transformation or conversion of the requests is dependent on the format of the request received from the subscriber 104 and the format understood or expected by the dispatcher 806. The requests received from the subscribers 104 typically refer to items corresponding to item information previously communicated to the subscribers 104 (e.g., the item identifier and optionally other information).

The scheduler 802 and coordinator 804 operate together to output a message of a particular type to the dispatcher 806. Table 2 illustrates an exemplary set of messages output to the dispatcher 806, based on the requests received from the subscribers 104, for use with an asset tracking database. The information included in these messages is supplied by the subscriber 104 sending the request.

TABLE 2

| Message Type | Description |
| --- | --- |
| Order Request | This message type requests the asset tracking system to create an order for the item. The message is to contain pricing information as well as data describing the purchaser (user). Each order message will contain a processing type indicating how the order is to be processed. Some processing types are processed in real-time. Other processing types can be directed to "queues" where administrators can approve them. Still others can just generate e-mail messages. In addition, each order message will indicate if a response is desired. |
| Order Cancel Request | This message type requests the asset tracking system to cancel a previously created order. The message will contain the order identifier and/or the asset number/identifier. |
| Reserve Request | This message type requests the asset tracking system to reserve a particular asset. The message is to contain data describing the reserver (user). In addition, each reserve message will indicate if a response is desired. |

TABLE 2-continued

| Message Type | Description |
| --- | --- |
| Reserve Cancel Request | This message type requests the asset tracking system to cancel the reservation on a previously reserved asset. The message will contain the asset number/identifier. |
| Info Request | This message is used to convey miscellaneous information to the asset tracking system (e.g., for storage in the archive field of the publishing database 226). For example: an auction site might send information on the number of bidders, high bidder, etc. The asset tracking system can do with this information as it chooses. There is typically no response. |
| Unsubscribe Request | This message indicates the site no longer wishes to receive this particular item or set of items. There is typically no response. |
| Reject Request | This message indicates the site has rejected an item. There is typically no response. |
| Refresh Request | This message indicates the site wishes to receive a refresh of item information for one or more items. A response (possibly asynchronous) will be sent. |

The dispatcher 806 receives messages from the coordinator 804 and determines, based on the type of message, which of the command processors 808 is to receive the message. The dispatcher 806 invokes the appropriate one of the command processors 808 and forwards the message to that processor. The command processors 808 include an information processor 810, an order processor 812, a reservation processor 814, a refresh processor 816, an unsubscribe processor 818, and a reject processor 820. The set of command processors 808 illustrated in FIG. 8 are particular to use with an asset tracking database. If other types of information are being maintained in the system, other command processors particular to that type of information are used.

Depending on the particular request, a response may be returned to the subscriber that submitted the request. These responses are sent from the appropriate one of the processors 808 to the publishing agent 402 of FIG. 4, which in turn includes the responses as messages to the appropriate subscriber analogous to the publication of information. Table 3 illustrates an exemplary set of responses that may be returned by the processors 808, based on the exemplary messages discussed above in Table 2.

TABLE 3

| Response Type | Description |
| --- | --- |
| Order Confirmation | This message type indicates that the asset tracking system has created an order for the asset. The response is to contain the confirmation type and may contain an order identifier. The confirmation type "Order Created" indicates that an order has been created and an order identifier has been generated. The confirmation type "Order Captured" indicates that an Order Request has been captured and will be processed at a later date. |
| Order Rejected | This message type indicates that an order request has been rejected. |
| Reserve Confirmation | This message type indicates that the asset tracking system has accepted the reserve request. |
| Reserve Rejected | This message type indicates that the asset tracking system has rejected the reserve request. |

The order processor 812 is a command processor that receives requests to create orders to purchase one or more assets. As discussed above in Table 2, order requests contain pricing and user data, as well as processing types and whether or not a response is desired. The order processor 812 processes orders as follows. First, an order creation routine associated with the system 102 is called to create and verify the requested order (e.g., verify funds for the order, verify addresses for shipping, etc.). The order creation routine results in either the creation of an order (in which case a valid order identifier is returned) or a failure (in which case an appropriate reason code is returned). If the order creation routine fails, then an "order rejected" response is returned to the requesting subscriber. However, if the order creation routine is successful, then an "order confirmation" response is returned to the requesting subscriber and the order processor 812 updates the publishing database 226 accordingly (e.g., to indicate either "sold" or "sale pending"). This updating is performed via the update monitor 224, which also causes the update to be communicated to the appropriate subscribers as discussed above.

The order processor 812 handles requests to cancel orders in an analogous manner. An order cancellation routine associated with the system 102 is called to cancel the requested order, and either a success or failure response is returned to the requesting subscriber depending on whether the order cancellation routine was successful and the publishing database 226 updated as appropriate (e.g., to indicate an item is no longer "sold" or "sale pending").

The reserve processor 814 is a command processor that receives requests to reserve one or more assets. As described above, reserve requests contain user data, and an indication of whether a response is desired. The reserve processor 814 processes reservation requests as follows. First, a reservation creation routine associated with the system 102 is called to reserve the requested item. The reservation creation routine results in either the successful reservation of the asset or a failure (in which case an appropriate reason code is returned). If the reservation routine fails, then a "reserve rejected" response is returned to the requesting subscriber. However, if the reservation routine is successful, then a "reserve confirmation" response is returned to the requesting subscriber and the reserve processor 812 updates the publishing database 226 accordingly (e.g., to indicate either "reserve"). This updating is performed via the update monitor 224, which also causes the update to be communicated to the appropriate subscribers as discussed above. Additionally, any subsequent order requests for the reserved item, from a subscriber other than the subscriber that reserved the item, will fail (e.g., by the order creation routine) for so long as the item is reserved.

The reserve processor 812 handles requests to cancel reservations in an analogous manner. A reserve cancellation routine associated with the system 102 is called to cancel the requested reservation, and either a success or failure response is returned to the requesting subscriber depending on whether the reserve cancellation routine was successful, and the publishing database 226 updated as appropriate (e.g., to indicate an item is no longer "reserved").

The information processor 810 receives requests containing informational messages from various subscribers 104. These may contain a wide variety of information, such as bidding information from auction sites, page view statistics, etc. The information processor 810 stores this information in the publishing database 226 (e.g., in an archive field). The information processor 810 does not generate any responses.

The unsubscribe processor 818 receives requests to unsubscribe a subscriber 104 from receiving item information for one or more items. The unsubscribe processor 818 deletes those entries in the publishing database 226 corresponding to the subscriber and the one or more items. The unsubscribe processor 818 does not generate any responses.

The reject processor 820 receives messages from various subscribers 104 indicating that the subscriber has rejected an item that was published to the site. The message optionally contains information describing the nature of the rejection. The reject processor 820 stores this information (if included in the message) in the publishing database 226 (e.g., in an archive field) and sends a message to the unsubscribe processor 818 to remove that entry from the publishing database 226. The reject processor 820 does not generate any responses.

The refresh processor 816 receives requests from various subscribers 104 to refresh the item information for one or more published items. The refresh processor 816 updates the publishing database 226 to schedule a refresh, such as by changing the status of those entries in the database 226 corresponding to the subscriber and the indicated one or more items. The publishing agent 402 detects this status in the database 226 and generates a new message to the subscriber including the information for the indicated one or more items.

The information tracking and publication system 102 allows for revenue generation in any of a wide variety of manners. For example, the owner of the system 102 may charge the subscribers 104 for access to the system 102, or charge the information sources (e.g., the sources of asset information being added to the database 222 for sale) for use of the system 102. The charges may be per-item, or alternatively based on different conditions (e.g., only charged when an item sells). Additionally, the owner of the system 102 may charge different subscribers 104 different rates for different services, such as increasing the frequency with which information updates are communicated to the subscribers that pay higher rates, imposing restrictions on the ability of non-paying subscribers to order assets (e.g., whether the subscriber pays can be checked as part of the order routine associated with the system 102). Furthermore, the owner of the system 102 may restrict the ability to reserve assets based on the rate paid, or require higher fees for longer reservation periods (e.g., the rate paid can be checked as part of the reserve routine associated with the system 102).

CONCLUSION

The discussions herein are directed primarily to software modules and components. Alternatively, the systems and processes described herein can be implemented in other manners, such as firmware or hardware, or combinations of software, firmware, and hardware. By way of example, one or more Application Specific Integrated Circuits (ASICs) or Programmable Logic Devices (PLDs) could be configured to implement selected components or modules discussed herein.

Although the invention has been described in language specific to structural features and/or methodological acts, it is to be understood that the invention defined in the appended claims is not necessarily limited to the specific features or acts described. Rather, the specific features and acts are disclosed as exemplary forms of implementing the claimed invention.

What is claimed is:

1. A system having one or more computing devices, comprising:
   an information tracking component configured to store, for each of a plurality of items, wherein each item is an asset available for purchase, information describing the item;
   a supply component configured to receive data describing the plurality of items and store the data as the information in the information tracking component;
   a publishing component configured to select, based on pre-established selection criteria, for each of a plurality of subscribers, a set of information from the information tracking component, and to communicate the selected set of information to local storage maintained by the subscriber, wherein the publishing component is configured to perform the communication by transferring the information to subscribers in advance of receiving requests from the subscribers to modify the information; and
   a subscriber request component configured to receive requests from the plurality of subscribers and modify the information stored in the information tracking component in accordance with the requests, wherein the subscriber request component is configured to receive a request to reserve a particular asset,
   wherein the publishing component is further configured to identify one or more of the plurality of subscribers affected by the modification to the information stored in the information tracking component, and to communicate, to the one or more of the plurality of subscribers affected by the modification, the information as modified, and to communicate to selected ones of the plurality of subscribers a notification that the asset is reserved and not available for sale.

2. A system as recited in claim 1, wherein the information tracking component is to store information regarding a plurality of assets.

3. A system as recited in claim 1, wherein the information tracking component is to store information regarding a plurality of services.

4. A system as recited in claim 1, wherein the information tracking component includes an information tracking database and a publishing database, wherein the information tracking database is configured to stores data describing the plurality of items, and wherein the publishing database stores data identifying which of the plurality of subscribers each of the plurality of items has been published to.

5. A system as recited in claim 4, wherein the publishing database is configured to identify the plurality of subscribers that each of the plurality of items has been published to based on the data in the publishing database.

6. A system as recited in claim 4, wherein the publishing database includes a status field used to identify the current respective status of the plurality of items.

7. A system as recited in claim 6, wherein the status field identifies the status of the plurality of items with respect to each of the subscribers that subscribe to the items.

8. A system as recited in claim 6, wherein the status has at least one of the states of:
   an active status indicating that an item is available for purchase;
   an inactive status indicating that the item is no longer available for purchase;
   deferred status indicating that the item will become available in the future;
   a sale pending status indicating that there is a sale pending for the item;
   a sold status indicating that the item has been sold; or
   a reserved status indicating that the item has been reserved for potential sale.

9. A system as recited in claim 1, wherein the publishing component is further to perform the selection for each subscriber based at least in part on criteria supplied by the subscriber, which defines the pre-established selection criteria.

10. A system as recited in claim 9, wherein the information tracking component is configured to identify each item using a plurality of fields, and wherein the criteria supplied by the subscriber is defined with reference to the fields.

11. A system as recited in claim 1, wherein the publishing component is further configured to perform the selection for each subscriber based at least in part on the information in the information tracking component describing each of the plurality of items.

12. A system as recited in claim 1, wherein the one or more of the plurality of subscribers affected by the modification to the information stored in the information tracking component comprise the ones of the plurality of subscribers to which the information was previously communicated.

13. A system as recited in claim 1, wherein the selected ones of the plurality of subscribers comprise only subscribers that received, as part of the set of information, information describing the particular asset.

14. A system as recited in claim 1, wherein the publishing component is further configured to communicate to one of the subscribers to delete information previously communicated to the one subscriber.

15. A system as recited in claim 1, wherein the publishing component is further configured to automatically communicate, to one of the subscribers, information in addition to the set of information previously communicated to the one subscriber.

16. A system as recited in claim 1, wherein the publishing component is further configured to communicate, to the plurality of subscribers, modifications to the set of information communicated to each subscriber.

17. A system as recited in claim 16, wherein the modifications include additional information describing additional items.

18. A system as recited in claim 16, wherein the modifications include deletions of information from the set of information.

19. A system as recited in claim 16, wherein the modifications include updates to the information in the set of information.

20. A system as recited in claim 1, wherein each item has an associated time indicating when it is available, and wherein the publishing component is further configured to communicate, as part of the set of information, only information corresponding to items for which the associated times indicate are currently available.

21. A system as recited in claim 1, wherein the subscriber request component is further configured to modify the information stored in the information tracking component in response to a request from a particular subscriber only if an appropriate fee is paid by the particular subscriber.

22. A system as recited in claim 1, wherein the supply component is configured to receive the data describing the one or more items in a plurality of different formats, and to convert the data into the format used by the information tracking component.

23. A system as recited in claim 1, wherein the subscriber request component is configured to receive requests from the plurality of subscribers in a plurality of different formats, and to convert the requests into a defined format.

24. A system having one or more computing devices, comprising:
   an information tracking component configured to store, for each of a plurality of items, information describing the item;
   a supply component configured to receive data describing the plurality of items and store the data as the information in the information tracking component and is configured to receive information having a data portion and an operation portion, wherein the data portion includes data received from a source, and the operation portion identifies an operation to be performed by the supply component;
   a publishing component configured to select, based on pre-established selection criteria, for each of a plurality of subscribers, a set of information from the information tracking component, and to communicate the selected set of information to local storage maintained by the subscriber, wherein the publishing component is configured to perform the communication by transferring the information to subscribers in advance of receiving requests from the subscribers to modify the information; and
   a subscriber request component configured to receive requests from the plurality of subscribers and modify the information stored in the information tracking component in accordance with the requests,
   wherein the publishing component is further configured to identify one or more of the plurality of subscribers affected by the modification to the information stored in the information tracking component, and to communicate, to the one or more of the plurality of subscribers affected by the modification, the information as modified.

25. A system as recited in claim 24, wherein the operation includes at least one of:
   an insert operation which provides an instruction to add an item to the information tracking component;
   an update operation which provides an instruction to update an item in the information tracking component; or
   a delete operation which provides an instruction to delete an item in the information tracking component.

* * * * *